June 27, 1933.  M. MAYER  1,915,610
FASTENING DEVICE
Filed May 6, 1932
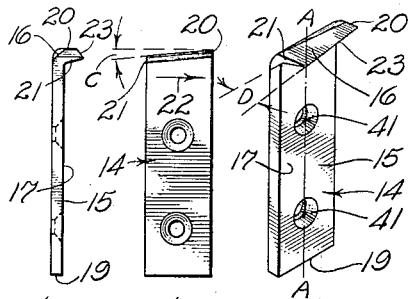
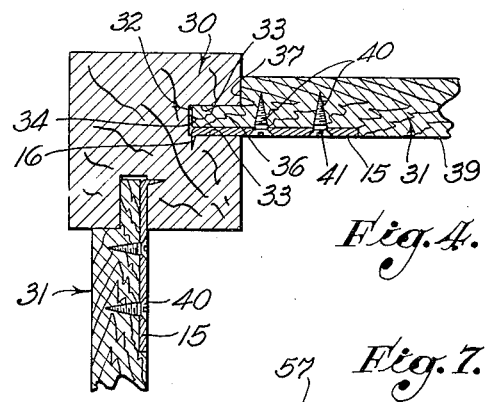
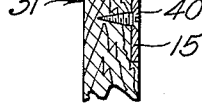
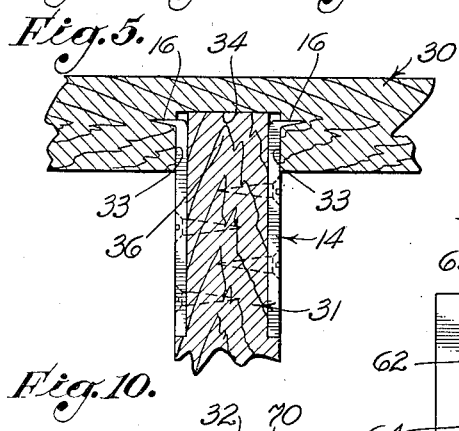
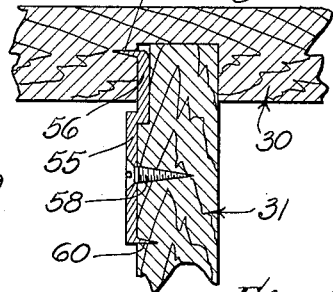
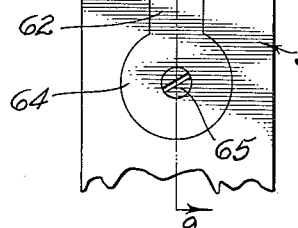
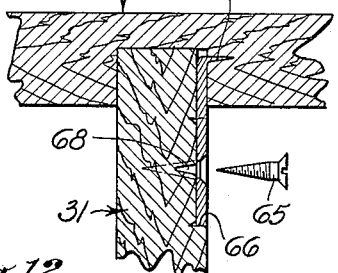
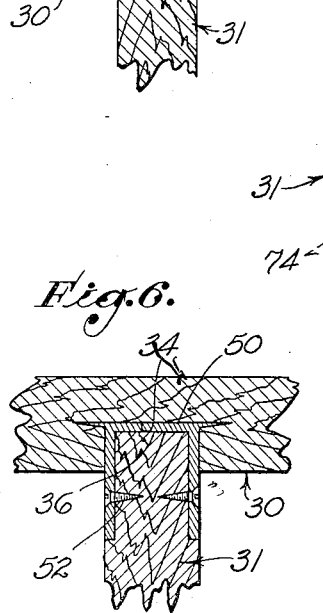
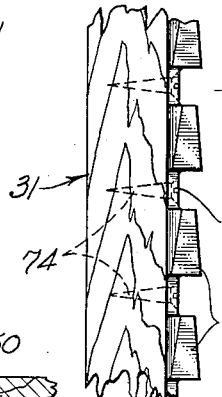
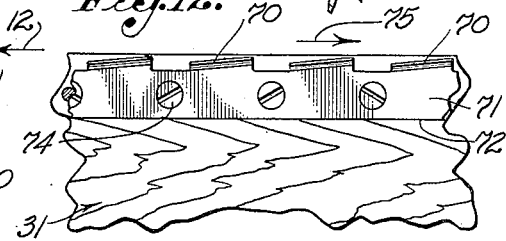
INVENTOR:
Martin Mayer,
BY
ATTORNEY.

Patented June 27, 1933

1,915,610

UNITED STATES PATENT OFFICE

MARTIN MAYER, OF LOS ANGELES, CALIFORNIA

FASTENING DEVICE

Application filed May 6, 1932. Serial No. 609,685.

My invention relates to a novel device for securing two members together, and finds particular utility in the wood-working art where it is desired to secure two members together which extend at right angles relative to each other. It is in the wood-working art that I will particularly describe the invention without limiting myself thereto.

One conventional method of securing two members together is by the use of a dovetail joint. However, the formation of such a joint requires careful surfacing and accurate measurements. Specially constructed machines are necessary if such a joint is to be formed by machine operations.

It is an important object of this invention to provide an improved mode af attaching two members together by the use of a third member detachably connected to one of the members.

The invention finds particular utility when used in a tongue-and-groove joint in which one member, hereinafter termed the groove-member, provides a groove including side walls and a bottom wall, and in which the other member, hereinafter called a tongue-member, extends into this groove, and it is another object of the invention to provide a fastening device including a blade extending outward from the tongue-member and into a side wall of the groove so that the tongue-member may be slid sidewise into the groove and so that the blade will form a depression in the side wall of the groove as the tongue-member is slid longitudinally along this groove.

A further object of the invention is to provide a fastening device of this type in which the blade is slightly angled so as to tend to draw the tongue-member farther into the groove as the tongue-member moves therealong.

This blade has a leading portion and a trailing portion and extends outward from a body which is in turn secured to the tongue-member. It is a further object of the invention to provide such a blade the outer edge of which extends from the leading portion to the trailing portion, this edge being angled with respect to the surface of the body so that the trailing portion penetrates into the side wall of the groove a distance greater than the leading portion.

Further objects of the invention reside in the configuration of the body and in the relationships between this body and the attached blade, while still further objects of the invention lie in the mode of securing the body to the tongue-member as will be hereinafter described.

Further objects and advantages of the invention will be made evident hereinafter.

Referring to the drawing in which several forms of the invention are illustrated,—

Fig. 1 is an end view of the fastening device of the invention.

Fig. 2 is a side view of this fastening device.

Fig. 3 is a perspective view of the fastening device.

Fig. 4 is a sectional view illustrating a combination including the fastening device shown in Figs. 1, 2, and 3.

Fig. 5 illustrates another combination including such fastening devices.

Figs. 6 and 7 are sectional views illustrating alternative forms of the invention.

Figs. 8 and 9 illustrate still another form of the invention, Fig. 9 being taken on the line 9—9 of Fig. 8 and showing the device in conjunction with the groove-member.

Figs. 10, 11, and 12 illustrate another form of the invention, Fig. 10 being a sectional view of this form, and Figs. 11 and 12 being corresponding views of the device secured to a tongue-member, Fig. 11 being a top view and Fig. 12 being a side view taken as indicated by the arrow 12 of Fig. 11.

The form of fastening device 14 illustrated in Figs. 1, 2, and 3 includes a flat body 15 with a blade 16 at the forward end thereof, this blade being of such length as to extend across the body 15. Any suitable means may be utilized for securing the blade to the body, but in the preferred embodiment of the invention this blade is formed integrally with the body and is bent to extend forward from a front face 17 thereof. The blade 16 preferably extends at substantially right angles to the body 15, though this angle may be slightly varied without departing from the spirit of the invention.

In some instances it is possible to form the blade from such a position, as best shown in rear end 19 of the body, or, in other words, so that it lies in a plane perpendicular to the axis A—A of the body 15. In the preferred embodiment, however, I prefer to angle this blade from such a position, as best shown in Fig. 2. This angle is relatively small, being indicated in Fig. 2 by the letter C. The more remotely positioned portion of the blade 16 comprises a leading portion 20, while the less remotely positioned portion of the blade is termed a trailing portion 21.

Whether or not the blade is angled as shown in Fig. 2, it is desirable that the edge thereof, indicated by the numeral 23, be sharpened and extend angularly with respect to the plane of the face 17, as best shown in Figs. 1 and 3, this angle being indicated by the letter D of Fig. 3. Inasmuch as the edge 23 connects the leading portion 20 and the trailing portion 21, it will be clear that the trailing portion 21 extends forward from the face 17 a distance greater than does the leading portion 20.

This type of securing device is relatively easy to manufacture and can be formed in a single operation by the use of a suitable die. In other instances it may be formed by a dual operation, the edge 23 being sharpened before the blade 16 is bent from the plane of the body 15.

In Fig. 4 I have illustrated one type of joint utilizing this fastening device. The groove-member is here indicated by the numeral 30, while the tongue-member is indicated by the numeral 31. The former member is shown as comprising a table leg and provides a groove 32 opening on a side face of the groove-member and on the upper edge or end of this member and including a pair of side walls 33 and a bottom wall 34. The tongue-member 31 provides a tongue or edge portion 36 which, in the form shown, is formed by cutting a channel 37 in the tongue-member 31 in a conventional manner thus leaving a shoulder which can abut against the side face of the groove-member. The thickness of the tongue 36 is such that it will rather snugly fit the groove 32 and yet be slidable longitudinally in this groove.

The body 15 of the fastening device of the invention is countersunk into one face 39 of the tongue-member so that the face 17 is flush with the face 39, as clearly shown in Fig. 4. The fastening device is attached to the tongue-member 31 by any suitable means such as by screws 40 extending through a pair of holes 41 formed in the body 15 and suitably countersunk to receive the heads of the screws 40. It will be clear that the device is secured in such position that the blade 16 extends outward from the tongue-member 31, and that the device is secured in place prior to the time that this tongue-member is inserted into the groove 32.

The tongue-member 31 and its attached fastening device is then moved sidewise into the groove 32 so that the tongue 36 moves longitudinally along the groove. When this is done the blade 16 is forced into one of the side walls 33 and forms a longitudinal depression therein. If, as in the preferred embodiment of the invention, the blade 16 is angled with respect to a plane perpendicular to the axis A—A, the tongue-member 31 should be inserted in such a direction that the leading portion 20 of the blade 16 enters the groove before the trailing portion 21 of this blade, this direction being indicated by the arrow 22 of Fig. 2. The angled blade 16 will thus tend to force the tongue-member 31 farther into the groove 32 as the tongue-member is slid longitudinally in this groove. This brings the shoulder formed by the channel 37 into snug engagement with the side face of the groove-member 30 and makes a very solid and durable joint.

It will be understood that it is not necessary to form any preliminary depression in the side wall 33 to receive the blade 16, for the blade itself performs this function. Extensive tests have shown that the angled blade 16 after being moved through a portion of the groove 32 does not leave a depression in the side wall 33 which is as large as the blade itself. The resilient nature of the wood fibers appears to allow the blade 16 to deform these fibers as the blade moves therepast, after which the fibers tend to move into their former position. This is especially true in view of the angled nature of the blade for as the blade moves along the groove 32 the fibers are gently forced to one side by contact with the surface of the blade 16. The net result is that the blade is firmly retained in position, and withdrawal of the tongue-member 31 in a direction opposite to that in which it was inserted is greatly retarded.

If the tongue-member 31 is to be removed from the groove 32, this can be accomplished by removing the screws 40 and pulling the tongue-member 31 in a direction transverse with respect to the groove. It should not be understood, however, that it is impossible to withdraw the tongue 36 longitudinally from the groove in a direction opposite to that in which it was inserted. This can be accomplished by proper manipulation, and it will be found that the blade 16 will usually follow the depression previously formed in the side wall.

In Fig. 5 I have illustrated a slightly different type of tongue-and-groove joint in which two of the fastening devices 14 are secured to the tongue-member 31 for the purpose of holding the edge portion 36 in a groove formed in the member 30, these devices being countersunk in opposed faces thereof and secured thereto so that the blades 16 thereof extend in opposite directions away from the tongue member 31. When this construction is used it will be understood that the blades 16, if angled at all, should be angled in the same direction so that the leading portion of each blade enters the groove first. This requires that a "right" and "left" fastening device be utilized. This form of the invention is particularly useful in not only greatly increasing the strength of the joint, but in maintaining the tongue-member 31 exactly perpendicular to the groove-member 30. This form of joint also differs from that shown in Fig. 4 inasmuch as the forward end of the tongue 36 is in surface contact with the bottom wall 34 of the groove.

In Fig. 6 is illustrated a similar form of the invention in which both of the blades are formed on the same body, this body being in the form of a U-shaped bracket 50 fitting around the tongue-member 31 and extending across the inner end of the tongue 36. The blades preferably extend outward at a section near the bottom wall 34 of the groove formed in the groove-member 30. The bracket 50 is connected to the tongue-member 31 by suitable means such as screws 52. This bracket may be countersunk into the tongue-member 31, as shown, or may be secured directly to the external surface of the tongue-member 31.

In Fig. 7 I have illustrated still another form of the invention which is not entirely countersunk, this form including a body 55 which is stepped so as to provide a head portion 56 which is countersunk into the tongue-member 31 and extends into the groove, this head portion carrying a blade 57 such as previously described. Another point of difference in this form of the invention is that but a single screw 58 is utilized for holding the body 55 against the tongue-member 31, the holding action of this screw being assisted by a pin 60 formed on the body 55 which is forced into the tongue-member 31 when the screw 58 is tightened.

Another very practical form of the invention is shown in Figs. 8 and 9. In this form of the invention the body is in the form of a head portion 62 which extends into the groove and carries a blade 63 in a manner previously described. At the rear end of this head portion is a circular member 64 providing an opening through which a screw 65 passes. The head portion 62 and circular member 64 are preferably countersunk in the tongue-member 31, and in this form of the invention this countersinking is very easily accomplished by first drilling a shallow circular opening with walls indicated by the numeral 66 of Fig. 9. A conventional wood drill is used for this operation and the point thereof penetrates the tongue-member 31 to form a depression 68 shown in Fig. 9. A channel 69, best shown in Fig. 8, is then cut to receive the head portion 62. The fastening device is then inserted and the screw 65 will thread into the depression 68 previously formed by the point of the drill.

Still another form of the invention is shown in Figs. 10, 11, and 12. Here several blades 70 are mounted on a body 71. These blades are formed as previously described and are preferably angled with respect to the rear end or edge 72 of the body 71. This form of the invention differs in that substantially the whole of the body 71 is positioned in the groove 32, being secured at spaced intervals to the tongue-member 31 by screws 74 which extend through countersunk openings of the body 71. This form of the invention may or may not be countersunk into the tongue-member 31, as desired. In the form illustrated the body portion is secured directly to the outer surface of this tongue-member.

It will also be understood that when utilizing the form of the invention shown in Figs. 10, 11, 12, it is not necessary to extend the body portion 71 completely across the face of the tongue-member 31. Thus, a length of the body 71 and its attached blades 70 can be cut into smaller sections, each section including one or more of the blades 70, and these sections can be secured at intervals across the face of the tongue-member. The tongue-member 31 and the fastening device can be moved into the groove 32 in a direction indicated by the arrow 75 of Fig. 12.

While I have illustrated several embodiments of the invention certain modifications thereof will be apparent to those skilled in the art and it should be understood that I am not limited to the exact forms shown. The utility of the device will be readily apparent. Thus, the novel fastening device of my invention can be utilized to secure side members to the legs of a piece of furniture, as shown in Fig. 4. Another very important use of the invention is in assembling portable partitions, the fastening device being secured to the partition and extending into a groove formed in an end member or connecting member. So also, the invention finds particular utility in positioning shelves in an enclosing structure, the fastening device being secured to the shelf and extending into a groove formed in the end member. Other uses of the invention will be apparent to those skilled in the art.

I claim as my invention:

1. In combination: a groove-member providing a pair of side walls and a bottom wall cooperating to define a groove extending inward from one face of said groove-member and opening on an edge of said groove-member; a tongue-member slidable sidewise into said groove and in a direction along the length of said groove; and a blade extending outward from said tongue-member and longitudinally with respect to said groove to such length that said blade is forced into one side wall of said groove and forms a longitudinal depression therein as said tongue-member slides longitudinally along said groove, thereby preventing withdrawal of said tongue-member from said groove in a direction transverse to the longitudinal dimension of said groove.

2. In combination: a groove-member providing a pair of side walls and a bottom wall cooperating to define a groove extending inward from one face of said groove-member; a tongue-member slidable sidewise into said groove and in a direction along the length of said groove; a metallic body detachably connected to said tongue-member and extending in said groove; and a blade on said body and extending outward beyond a face of said body to provide an edge extending longitudinally of said groove and of such length as to be forced into one side wall of said groove to form a longitudinal depression therein as said tongue-member slides longitudinally along said groove, thereby preventing withdrawal of said tongue-member from said groove in a direction transverse to the longitudinal dimension of said groove.

3. In combination: a groove-member providing a pair of side walls and a bottom wall cooperating to define a groove extending inward from one face of said groove-member and opening on an edge of said groove-member; a tongue-member slidable sidewise into said groove and in a direction along the length of said groove; a metallic body extending along one surface of said tongue-member from a point outside said groove to a point inside said groove; a blade on said body at a section in said groove and providing an edge extending longitudinally of said groove, said blade extending from said metallic body to such a distance that said blade is forced into one side wall of said groove to form a longitudinal depression therein as said tongue-member slides longitudinally along said groove, thereby preventing withdrawal of said tongue-member from said groove in a direction transverse to the longitudinal dimension of said groove; and means cooperating with that portion of said metallic body which lies outside said groove for detachably connecting said metallic body to said tongue-member, whereby detachment of said metallic body will permit withdrawal of said tongue-member from said groove in a direction transverse to the length of said groove.

4. A combination as defined in claim 2 in which said blade provides a leading portion and a trailing portion and in which said blade is angled slightly with respect to the direction in which said tongue-member is moved along said groove, said leading portion being disposed closer to said bottom wall of said groove than said trailing portion, whereby movement of said tongue-member longitudinally along said groove tends to force said tongue-member further into said groove.

5. A combination as defined in claim 2 in which said blade provides a leading portion and a trailing portion, and in which the outer portion of said blade provides an edge, and in which said edge is angled with respect to the surface of said metallic body in such direction that said leading portion extends outward a shorter distance from said surface of said metallic body than does said trailing portion.

6. A combination is defined in claim 2 in which said blade provides a leading portion and a trailing portion, and in which said blade is angled slightly with respect to the direction in which said tongue-member is moved along said groove, said leading portion being disposed closer to said bottom wall of said groove than said trailing portion, whereby movement of said tongue-member longitudinally along said groove tends to force said tongue-member further into said groove, and in which the outer portion of said blade provides an edge connecting said leading and trailing portions, said edge being angled with respect to the surface of said metallic body in such direction that said leading portion extends outward a shorter distance from said surface of said metallic body than does said trailing portion.

7. A combination as defined in claim 3 in which said last-named means includes a hole in said portion of said metallic body lying outside said groove and a screw extending through said hole and into said tongue-member.

8. A combination as defined in claim 3 in which said portion of said metallic body lying outside said groove provides a circular portion which is larger in diameter than the distance across said metallic body and in which said last-named means comprises a hole formed through said circular portion and a screw extending therethrough and into said tongue-member.

9. A combination as defined in claim 2 in which said metallic body extends longitudinally along said groove and including means lying inside said groove when said tongue-member is advanced into said groove for holding said metallic body to said tongue-member.

10. A fastening device for a member having its edge portion slidable longitudinally into a groove in another member, comprising: a metal body adapted to be secured to said edge portion of said first member and having a blade portion to extend laterally from said edge portion so as to engage a side wall of said groove as said edge portion is moved longitudinally into said groove.

11. A device as defined in claim 10, in which said blade portion has an inclined face for engaging said side wall of said groove whereby the movement of said inclined face in engagement with said side wall of said groove will draw said edge portion toward the bottom of said groove.

12. A fastening device for a member having its edge portion slidable longitudinally into a groove in another member, comprising: a metal body adapted to be secured to said edge portion of said first member and having a blade portion to extend laterally from said edge portion so as to penetrate a side wall of said groove as said edge portion is moved longitudinally into said groove, said blade portion of said metal body being sharpened.

13. A fastening device for a member having its edge portion slidable longitudinally into a groove in another member, comprising: a metal body adapted to be secured to said edge portion of said first member and having a blade portion to extend laterally from said edge portion so as to penetrate a side wall of said groove as said edge portion is moved longitudinally into said groove, said blade portion of said metal body being sharpened and being inclined relative to its direction of movement in said groove to draw said edge portion toward the bottom of the groove as said edge portion is moved longitudinally therein.

In testimony whereof, I have hereunto set my hand at Los Angeles, California, this 2nd day of May, 1932.

MARTIN MAYER.